United States Patent [19]

Heilmann et al.

[11] Patent Number: 5,000,321
[45] Date of Patent: Mar. 19, 1991

[54] PACK MADE OF COMPOUND FOIL AND CORRESPONDING PRODUCTION METHOD

[75] Inventors: Wolfgang Heilmann; Andreas Maurer, both of Bremen, Fed. Rep. of Germany

[73] Assignee: Jacobs Suchard AG, Zurich, Switzerland

[21] Appl. No.: 415,110

[22] Filed: Sep. 29, 1989

[30] Foreign Application Priority Data

Oct. 5, 1988 [DE] Fed. Rep. of Germany ....... 3833939

[51] Int. Cl.$^5$ .............................................. B65D 5/54
[52] U.S. Cl. ................................ 206/621.3; 206/621.1; 206/621.2
[58] Field of Search ............... 206/621.1, 621.2, 621.3, 206/620, 630, 621; 229/123.1, 123.2

[56] References Cited

U.S. PATENT DOCUMENTS

| | | | |
|---|---|---|---|
| 2,234,013 | 3/1941 | Stover . | |
| 3,245,603 | 4/1966 | Wilcox | 206/621.2 |
| 3,247,957 | 4/1966 | Kemble . | |
| 3,272,425 | 9/1966 | Bendersky et al. | 229/123.2 |
| 3,297,227 | 1/1967 | Wallsten | 229/123.2 |
| 3,416,716 | 12/1968 | Stark et al. | 206/621.3 |
| 3,437,257 | 4/1969 | Bua | 229/123.1 |
| 4,386,706 | 6/1983 | Korte | 229/123.2 |
| 4,410,128 | 10/1983 | Rausing | 206/621 |
| 4,533,063 | 8/1985 | Buchner et al. | 229/123.2 |
| 4,655,387 | 4/1987 | Magnusson | 206/621 |

FOREIGN PATENT DOCUMENTS

| | | | |
|---|---|---|---|
| 724024 | 12/1965 | Canada | 206/621.2 |
| 0042832 | 12/1981 | European Pat. Off. . | |
| 54938 | 3/1967 | Fed. Rep. of Germany . | |
| 7508452.5 | 7/1975 | Fed. Rep. of Germany . | |
| 2407175 | 8/1975 | Fed. Rep. of Germany . | |
| 3535957 | 4/1987 | Fed. Rep. of Germany . | |
| 3545731 | 7/1987 | Fed. Rep. of Germany . | |
| 8536241.7 | 5/1988 | Fed. Rep. of Germany . | |
| 8801815.6 | 5/1988 | Fed. Rep. of Germany . | |
| 3807469 | 1/1989 | Fed. Rep. of Germany . | |
| 2456676 | 5/1979 | France . | |
| 61-242781 | 10/1986 | Japan . | |
| WO86/02909 | 9/1985 | PCT Int'l Appl. . | |
| 258599 | 11/1946 | Switzerland . | |
| 785821 | 11/1957 | United Kingdom . | |
| 1014210 | 12/1965 | United Kingdom | 206/621.3 |
| 2112745 | 7/1983 | United Kingdom . | |
| 2190658 | 11/1987 | United Kingdom | 206/621.2 |

Primary Examiner—Gary E. Elkins
Attorney, Agent, or Firm—Burns, Doane, Swecker & Mathis

[57] ABSTRACT

A package for holding commodities is fabricated from a multilayer compound foil material. The package includes at least one transversely extending closure seam and an opening arrangement positioned adjacent the closure seam. The opening arrangement includes at least one generally line-shaped opening section in which the compound foil is weakened in comparison to areas adjoining the opening section in order to facilitate a guided opening of the opening arrangement.

14 Claims, 4 Drawing Sheets

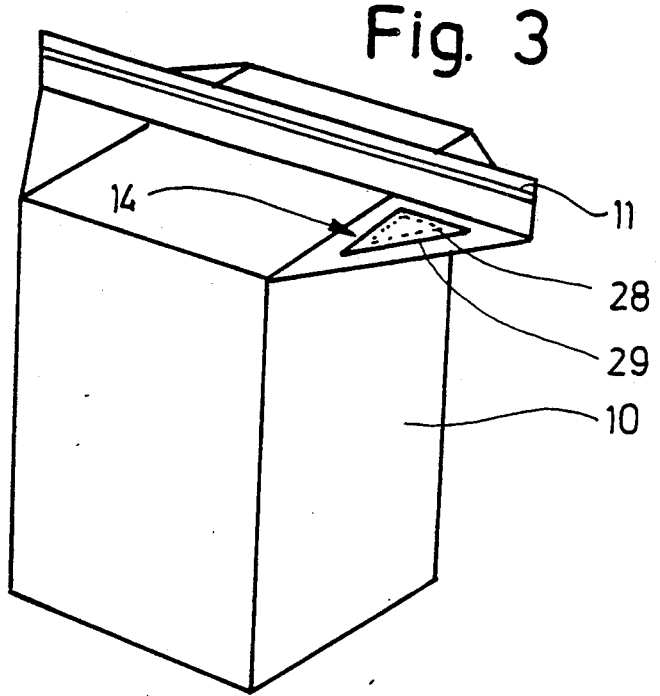
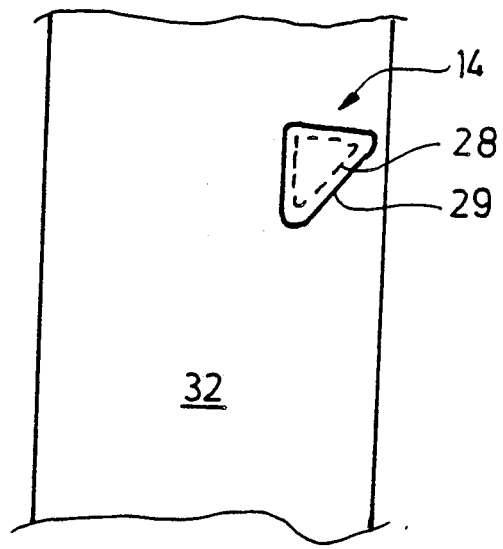

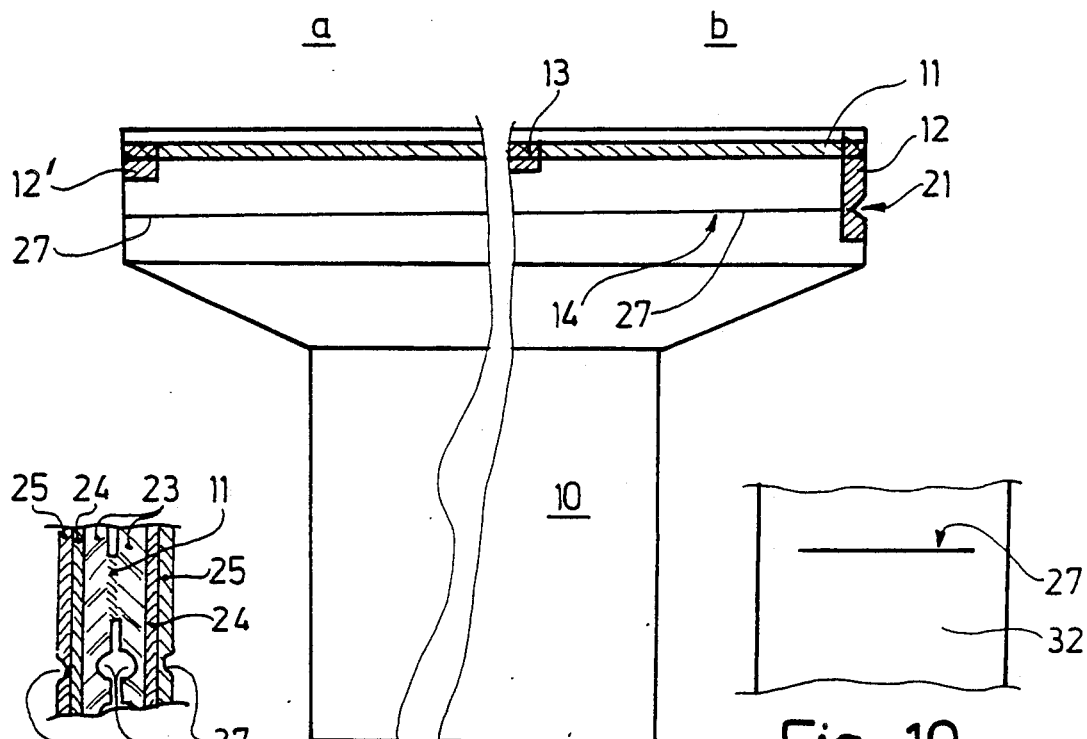
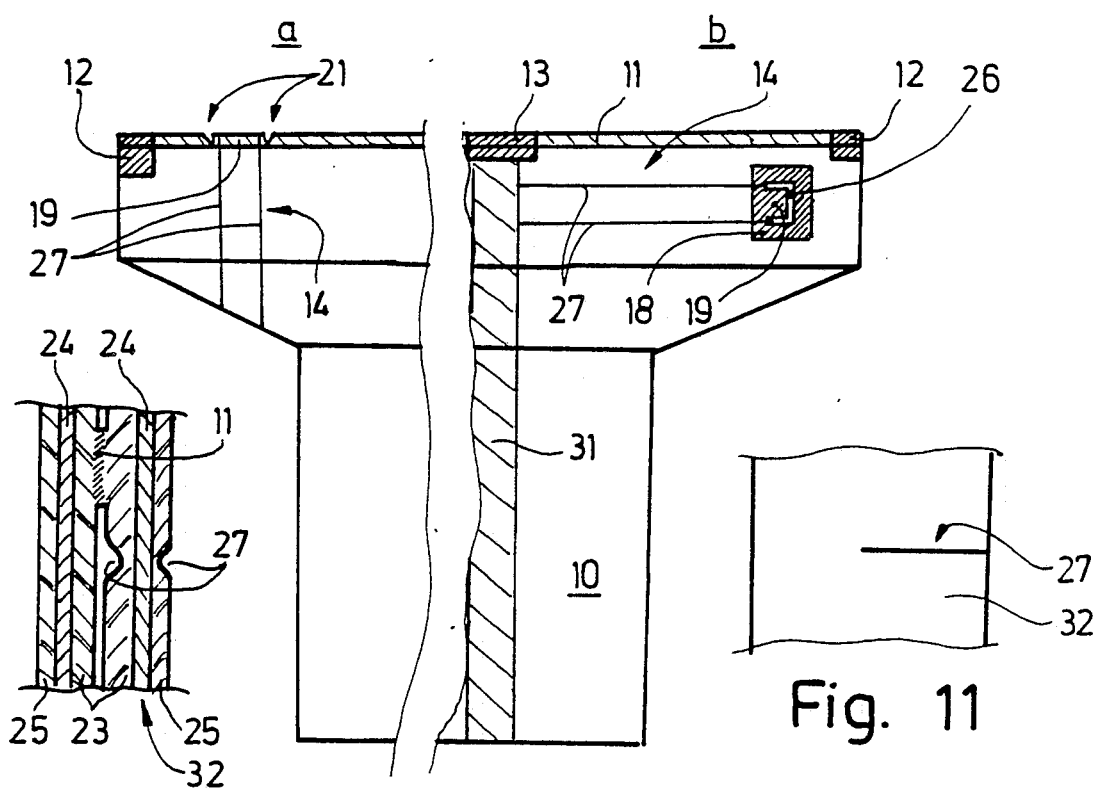

PACK MADE OF COMPOUND FOIL AND CORRESPONDING PRODUCTION METHOD

FIELD OF THE INVENTION

The invention concerns a pack made of multilayer compound foil, which is formed into a foil tube by means of a longitudinal seam, and which has at least one (upper) transversely running closure seam with opening devices neighbouring the latter seam.

BACKGROUND OF THE INVENTION

Packs made of compound, that is to say coated foils, can be employed in a number of different fields of the packaging technique. These packs mainly consist of a tube section of the compound foil, having a longitudinal seam and transversely running closure seams. They serve for holding particularly foods and luxury foods, sweets, chocolate and roasted coffee. Packs for roasted coffee are mainly designed as vacuum packs, as can be seen for example in the embodiment according to DE-A-38 29 042.1.

In order to allow an easier opening of such foil packs, an opening device is placed near the (upper) closure seam. DE-A-38 29 042.1 shows appropriate solutions.

SUMMARY OF THE INVENTION

The task of the invention is to suggest different further opening aids for these kind of packs. These shall be, in accordance with the task the invention is based on, easy to handle, and they shall guarantee an unhindered access to the pack contents, but still ensure, and that also goes for the vacuum pack version, the tightness of the pack.

In order to accomplish this task, the vacuum pack or rather the opening aid according to the invention is characterized in that the opening devices comprise at least one basically line-shaped opening section, where the compound foil is weakened compared to the areas adjoining this section, in order to guarantee a guided opening.

Multilayer compound foils, especially the ones for vacuum packs, are characteristically impossible or very hard to tear. It is particularly impossible to leave a straight tearing edge when opening them. The positioning of the weakened lines in the compound foil according to the invention, guarantees foil tightness and at the same time a local easy-to-tear weakening along the (straight) contour of the weakened line.

A weakened line and therewith a determined tearing line of the compound foil can also be achieved according to the invention by means of an opening aid, consisting of reinforcement sections or strips, which are placed inside or preferably on the outside of the foil, with the tear running along one side edge of the reinforcement section. A further embodiment of the invention suggests two strip-shaped reinforcement sections which are joined by small, transversely running material links, thus forming a slit with small interruptions. When opening the pack, the tear in the compound foil runs along this slit.

The weakenings of material can be achieved in different ways. The invention suggests a notch or groove in the compound foil, formed by a laser beam ($CO_2$-laser), whose radiation is absorbed by the synthetic material, thus heating it up; but reflected by the inner metal, i.e. aluminium layer. The absorption of the radiation causes the synthetic layer to melt in a very small area. It contracts due to the surface tension of the melted mass, so that a groove is formed after solidification. Instead of such a weakening of material by changing the dimension (thickness of synthetic layers) it is also possible to change the inner structure of the synthetic layers in the opening section along a line. This can be achieved for example by a change in the polymerization grade, which means an artificial ageing, for example with the aid of harder radiation like that of a UV laser. It is also possible to combine the above-described steps. Another alternative way of weakening the material in the opening section would be to strain it in a line-shaped area. With this method it must be ensured that the metal layer remains compact.

Another way would be to control the energy input to the laser so that it only partially penetrates the compound foil layers, so that foil tightness is preserved.

The opening aids of the above-described kind, especially the ones involving laser treatment, will be produced, that is to say added, preferably during foil production, but in any case before the formation of foil blanks for the packs. That means a continuous material web of the compound foil from which the blanks are cut off, is equipped with the opening devices according to the invention in their proper position. This method guarantees an efficient formation of tear-open aids, particularly with the foil web being conveyed along a stationary laser.

BRIEF DESCRIPTION OF THE DRAWING FIGURES

Further details of the invention are described below with reference to embodiments and corresponding drawings which show:

FIG. 1—a perspective view of a filled pack according to first preferred embodiment;

FIG. 2—a cut along line II—II of FIG. 1;

FIG. 3—a perspective view of an alternative as regards shape to the embodiment shown in FIG. 1;

FIG. 4—the top view of a foil web used for producing a pack as shown in FIG. 3;

FIGS. 5a and 5b—the side view of a pack according to a second embodiment of the invention;

FIG. 6—the top view of a foil web used for producing a pack as shown in FIG. 5b;

FIG. 7—an enlarged representation of the area marked VII in FIG. 6;

FIG. 8—a cut along line VIII—VIII of FIG. 7;

FIGS. 9a and 9b—a representation similar to that of FIG. 5, showing a further preferred embodiment of the invention;

FIGS. 10 and 11—top views of foil webs used for producing packs as shown in FIG. 9a and 9b respectively;

FIGS. 12 and 13—cuts along the lines XII—XII and XIII—XIII respectively as shown in FIGS. 9a and 9b; and FIGS. 14a and 14b—the side view of a pack according to a further preferred embodiment of the invention.

DETAILED DESCRIPTION OF THE PREFERRED EMBODIMENTS

Figure 1:
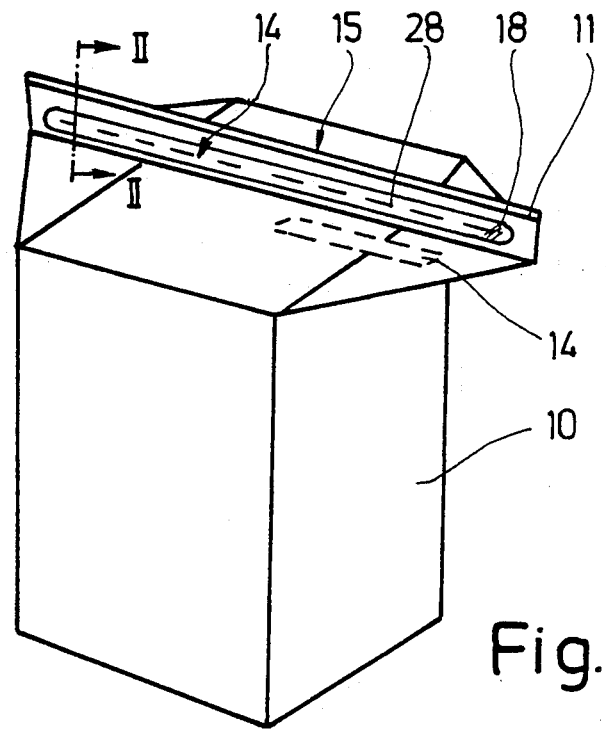

The embodiments of tear-open aids shown in the drawings can be used with different designs of packs made of composite foils. These foils normally have a basic structure characterized in that a tube is formed out of a foil web by means of a longitudinal seam. One section of the tube forms the pack with transversely running seams at both ends.

The examples of complete packs shown in the drawings are vacuum packs, especially for holding ground roast coffee. With this type of foil pack, a cuboidal coffee block 10 is formed inside the pack by evacuation, staying solid and shape-retaining because of the vacuum. The upper end of the pack is sealed tightly by a transversely running closure seam 11. A longitudinal seam 31 can either—as shown in FIG. 14—run centric down the back side of the pack or along the side (not shown). With the preferred embodiments shown in FIGS. 5, 9 and 14, side partial seams 12, 12' are formed at first as well as the fixing seam 13, sitting inbetween the two. This has the effect, that the opening formed between the side partial seams 12, 12', which basically folds open easily, is kept folded shut by the fixing seam 13. During evacuation the air can still be sucked out through the two partial openings. Afterwards, the closure seam 11 is formed, stretching over the whole width.

Figure 2:
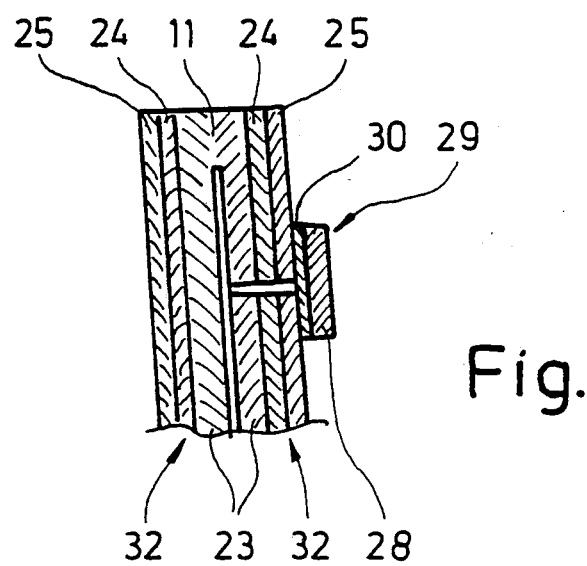

For opening the pack it is provided with an opening section 14 in the area between closure seam 11 and coffee block 10. In the embodiments shown in FIGS. 1 to 3, the opening section 14 comprises a slit 28 (see FIG. 2), which completely severs one of the two compound foils 32 in the fold area. That means slit 28 runs through the outer synthetic layers 23 and 25 and through the aluminium layer 24, which is lying between the two. A peel-label 29 is stuck on slit 28, sealing it tightly. Adhesive layer 30 connects the peel-label 29 tightly to the outer synthetic layer 25 of compound foil 32. As the interior of the pack, including the spaces inbetween the two inner synthetic layers 23 is evacuated to a certain extent, the air pressure forming on the outside presses peel-label 29 tightly on the outer surface of compound foil 32, thus enhancing the adhesive effect. With the embodiment in FIG. 1, shown by complete lines, the peel-label is to be a thin strip sitting in the area of the closure section 15 and running parallel to closure seam 11 over basically the whole width of the closure section 15. Another embodiment of the invention is suggested by the perforated lines in FIG. 1. In this version, opening section 14 is sitting so far underneath the closure section 15, that it rests on the coffee block in the section of the triangular folding flap. With the embodiment shown in FIG. 3 cut 28 forms a basically triangular opening sitting on the folding flap. Preferably a web of compound foil 32 as shown in FIG. 4 is used for producing such a pack. This web has to have (before leaving the reel) at least cuts 28, being spaced appropriately. For the production of a pack as shown in FIG. 3, cut 28 can also be cut in such a way, that the section of compound foil 32, which is circumscribed by cut 28, still is connected to the rest of the web. In that case a pouring-out opening is revealed after or at the moment of peeling off peel-label 29.

Figure 5:
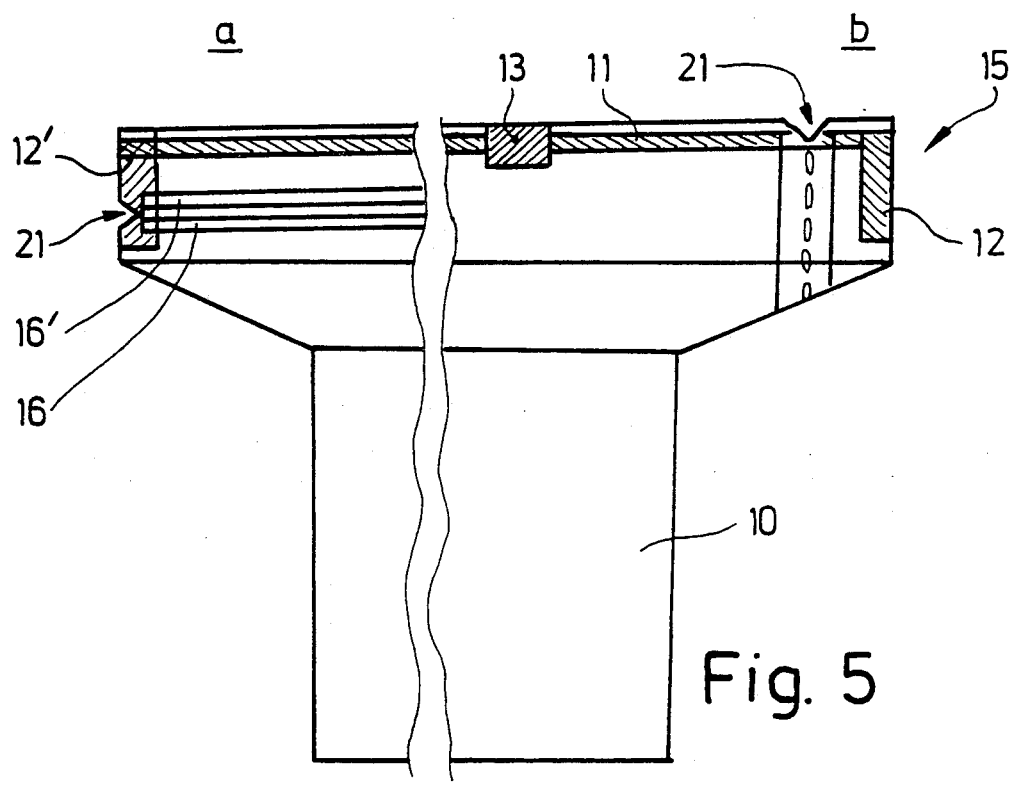
Figure 8:
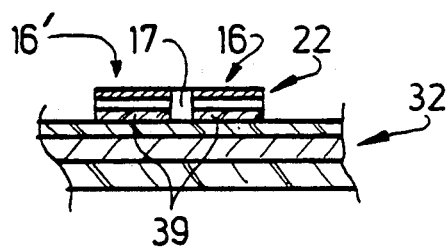
Figure 7:
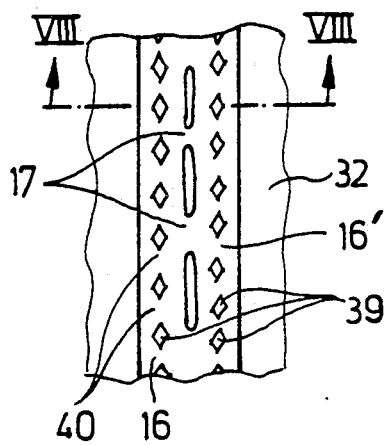
Figure 6:
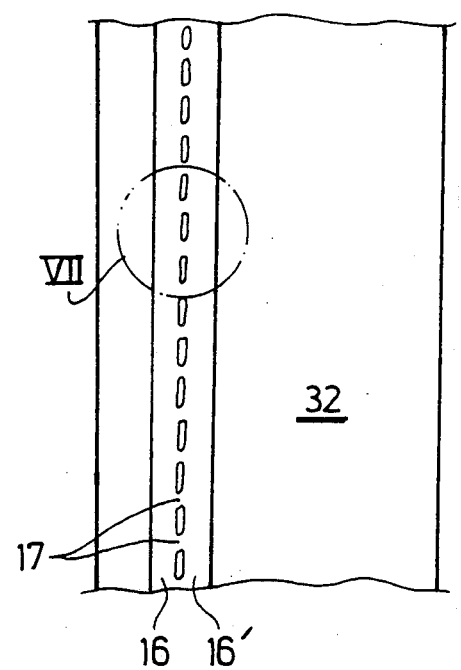

In a further preferred embodiment of the invention shown in FIGS. 5 to 7, compound foil 32 itself is not changed. For forming the opening section 14, two completely separated and slightly spaced apart parallel running reinforcement strips 16, 16' are planned (FIG. 5a). These strips could also be joined by splittable material links 17 (FIGS. 6 to 8). Reinforcement sections 16, 16' can either run parallel (FIG. 5a) or vertical (i.e. generally perpendicular) (FIG. 5b) to closure seam 11. In both cases it is profitable to form a groove 21 on the edge of closure section 15, thus facilitating the process of tearing and guiding the tear towards the middle between reinforcement sections 16, 16'. Obviously, groove 21 only stretches out so far into closure section 15, that tightness of the design (achieved by closure seam 11 and partial seam 12' respectively) is still guaranteed.

While the embodiment shown in FIG. 5a ensures that the split formed during opening does not lead to the pack contents, the embodiment shown in FIG. 5b has the advantage, that a foil web 32 (see FIG. 6) can receive a continuous reinforcement section 16, 16' either during production or immediately before or during foil tube formation.

It is highly profitable for reinforcement section 16, 16' as shown in FIG. 7 and 8, to be only joined to compound foil 32 by rows of dot-like joints 39 so that interruptions 40 are left in the link between joints 39. Joints 39 can either be glued or welded. This special form of joining ensures that when using continuous joining strips, the material of the pack compound foil 32 does not fold up at the edge of or the passage to reinforcement section 16, 16', which could lead to difficulties during the pack production process.

Reinforcement section 16, 16' can certainly also be designed in such a way that those sections running parallel to the foil web (FIG. 5b, FIG. 6) are only formed in pieces so that they are not stretching over the whole length of the pack. Material used for reinforced sections 16, 16' can be a compound foil 22 (FIG. 8), just like the pack compound foil 32.

A further preferred embodiment of the invention shown in FIGS. 9 to 14 has an opening section 14, which comprises line-shaped weakened sections 27, in which the material of the compound foil 32 is weakened as regards it breaking strength. In FIGS. 12 and 13 these weakened sections 27 are drawn as grooves according to one embodiment of the invention. In the area of these grooves, synthetic layers 23 and 25, which are lying on aluminium layer 24 are thinner than anywhere else on the pack compound foil. This can be achieved for example by heating it up with a laser beam. A change in breaking strength of a line-shaped section can not exclusively be achieved by macroscopic changes (groove), but also via changes in the inner material structure, for example by means of changes in the grade of polymerization of the material.

Running the line-shaped weakening 27 only on one side to the edge of foil 32 (during foil production or immediately before or during foil tube formation) leads to the embodiment shown in FIGS. 9 and 13. Equipping a foil web 32 with weakenings 27 as shown in FIG. 10 leads to embodiment shown in FIGS. 9 and 12.

The embodiment shown in FIG. 9b is to be provided with a groove 21 in the area of the partial side seam 12, as explained above concerning another embodiment, with the groove pointing towards the weakening 27. The partial seam 12' in the embodiment shown in FIG. 9a is so short, that it does not reach the weakening 27. Both versions are of course interchangeable.

Further preferred embodiment shown in FIG. 14 is to be provided with two parallel running weakenings 27 so that they are defining a strip. Preferably this strip has on its end a grip tab, which is formed in the embodiment as shown in FIG. 14a with opening section 14 running perpendicularly to closure seam 11, by two appropriate grooves 21.

With invention embodiment shown in FIG. 14b, grip tab 19 is defined by a U-shaped punch cut 26, sitting in a sealing section 18, in which the two inner layers 23 of the pack compound foil 32 are welded together. That way, no air can enter the pack even in the area of the U-shaped punch cut 26. The sides of punch chut 26 adjoin or merge into the ends of the two weakenings 27. If grip tab 19 of the embodiment shown in FIG. 14 is pulled, a strip of the pack compound foil 32 is torn out, leaving an opening for pouring out the pack contents.

As follows from the previous paragraphs, the above described characteristics of the invention can be combined, especially the ones described in connection with FIGS. 5 to 8 and 9 to 14 respectively. Weakenings 27 (FIGS. 10 to 14) can be placed particularly in the area between reinforcement sections 16, 16' (FIGS. 5 to 8), thus decreasing the force needed for opening the pack.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced hereby.

We claim:

1. A pack for holding contents, comprising: a tube of multilayer compound foil having a longitudinally extending seam, at least one transversely extending closure seam and at least one opening device positioned adjacent the closure seam, said opening device including at least one generally line-shaped opening section, at least a portion of the compound foil in said at least one generally line-shaped opening section being weakened relative to areas of the compound foil positioned adjacent said opening section to facilitate a guided opening of the opening device, and including reinforcement sections in the form of material strips that are attached to the compound foil adjacent the opening section, said reinforcement sections extending substantially parallel to the opening section.

2. The pack according to claim 1, wherein the reinforcement sections are joined to one another by transversely extending material links.

3. The pack according to claim 2, wherein the reinforcement sections are attached to an outside portion of the compound foil at spaced apart points, and including a punch cut formed in an edge of the pack for facilitating tearing of the compound foil and for guiding a torn portion of the compound foil to an area between the reinforcement sections.

4. The pack according to claim 3, wherein the reinforcement sections are glued to the outside portion of the compound foil.

5. The pack according to claim 3, wherein the reinforcement sections are welded to the outside portion of the compound foil.

6. The pack according to claim 3, wherein the compound foil includes a metal layer positioned between an outer synthetic layer and an inner synthetic layer, wherein the portion of the compound foil that is weakened is formed in at least one of the outer synthetic layer and the inner synthetic layer.

7. The pack according to claim 6, wherein the weakened portion of the compound foil is formed without affecting the metal layer by heating a line-shaped area with a laser beam.

8. The pack according to claim 6, wherein the metal layer is aluminum.

9. The pack according to claim 1, wherein the compound foil is completely severed in the opening section, and including a removable closure strip attached to the compound foil, said closure strip covering the opening section.

10. The pack according to claim 1, wherein the opening section extends over a substantial portion of a width of the pack.

11. A pack according to claim 1, wherein the compound foil includes a metal layer positioned between an outer synthetic layer and an inner synthetic layer, the portion of the compound foil that is weakened being formed in at least one of the outer synthetic layer and the inner synthetic layer.

12. A pack according to claim 2, wherein the compound foil includes a metal layer positioned between an outer synthetic layer and an inner synthetic layer, wherein the portion of the compound foil that is weakened is formed in at least one of the outer synthetic layer and the inner synthetic layer.

13. A pack for holding contents, comprising: a tube of multilayer compound foil having a longitudinally extending seam, at least one transversely extending closure seam and at least one opening device positioned adjacent the closure seam, said opening device including at least one generally line-shaped opening section, said compound foil including a metal layer positioned between an outer layer and an inner layer, at least a portion of the compound foil in said generally line-shaped opening section being weakened relative to areas of the compound foil positioned adjacent said opening section to facilitate a guided opening of the opening device, the weakened portion of the compound foil being formed without substantially affecting the metal layer by heating a line-shaped area of the compound foil with a laser beam.

14. A pack for holding contents, comprising: a tube of multilayer compound foil having a longitudinally extending seam, at least one transversely extending closure seam and at least one opening device positioned adjacent the closure seam, said opening device including at least one generally line-shaped opening section, said compound foil including a metal layer positioned between an outer synthetic layer and an inner synthetic layer, at least one of said inner synthetic layer and said outer synthetic layer in said generally line-shaped opening section being weakened relative to areas of the compound foil positioned adjacent said opening section to facilitate a guided opening of the opening device.

* * * * *